United States Patent [19]

Forsman

[11] 4,092,785
[45] June 6, 1978

[54] TEACHING AND DISPLAY APPARATUS

[76] Inventor: Edwin E. Forsman, P.O. Box 1524, Pocatello, Id. 83201

[21] Appl. No.: 760,134

[22] Filed: Jan. 6, 1977

[51] Int. Cl.² .............................................. G09B 1/02
[52] U.S. Cl. .............................................. 35/1; 35/60; 272/14; 272/25
[58] Field of Search .................... 35/1, 60; 52/33, 36, 52/71; 272/1 R, 9, 15, 16, 17, 18, 21, 25

[56] References Cited

U.S. PATENT DOCUMENTS

| | | | |
|---|---|---|---|
| 406,271 | 7/1889 | Emerson | 272/9 |
| 1,297,473 | 3/1919 | Johnson | 272/25 |
| 3,093,372 | 6/1963 | Cirami | 272/1 R X |
| 3,563,538 | 2/1971 | Harper | 272/1 R |

Primary Examiner—Harland S. Skogquist
Attorney, Agent, or Firm—Clarence A. O'Brien; Harvey B. Jacobson

[57] ABSTRACT

A teaching and display apparatus having three panels connected at angles to one another with the main front panel being a display and multipurpose panel for allowing the operator within said apparatus to present numerous instructional displays as well as teaching materials on portions of the front panel. The angled side panels are foldable so that the entire apparatus may be easily stored or transferred. Also, each side panel is provided with a door to permit the operator free access into and out of the device. The back of the apparatus may be enclosed with a cloth back cover to give the operator of the apparatus complete privacy. The device has alphabetic grid structure, multi-purpose stages for puppets, masks, drawings, films, slides, etc., rear projection screen and flashcard panel, three rotatable disc panels for displaying immovable objects such as drawings, slides, photographs, etc., several one-way mirror structures, numbers 1–10 grid structure, control knobs to permit the audience or spectators to communicate with the operator within the apparatus, YES and NO flashers, control knobs for the rotatable display panels, mechanical arms to permit the operator of the apparatus to reach in front of the panel for various operations, sound speakers, two of which are connected in stereo fashion and one in monaural fashion, lift panels to permit objects to be deposited onto two extendable ramp structures for transfer of gifts from the apparatus to the audience, and an exchange bin to permit the audience to exchange items with the apparatus.

8 Claims, 9 Drawing Figures

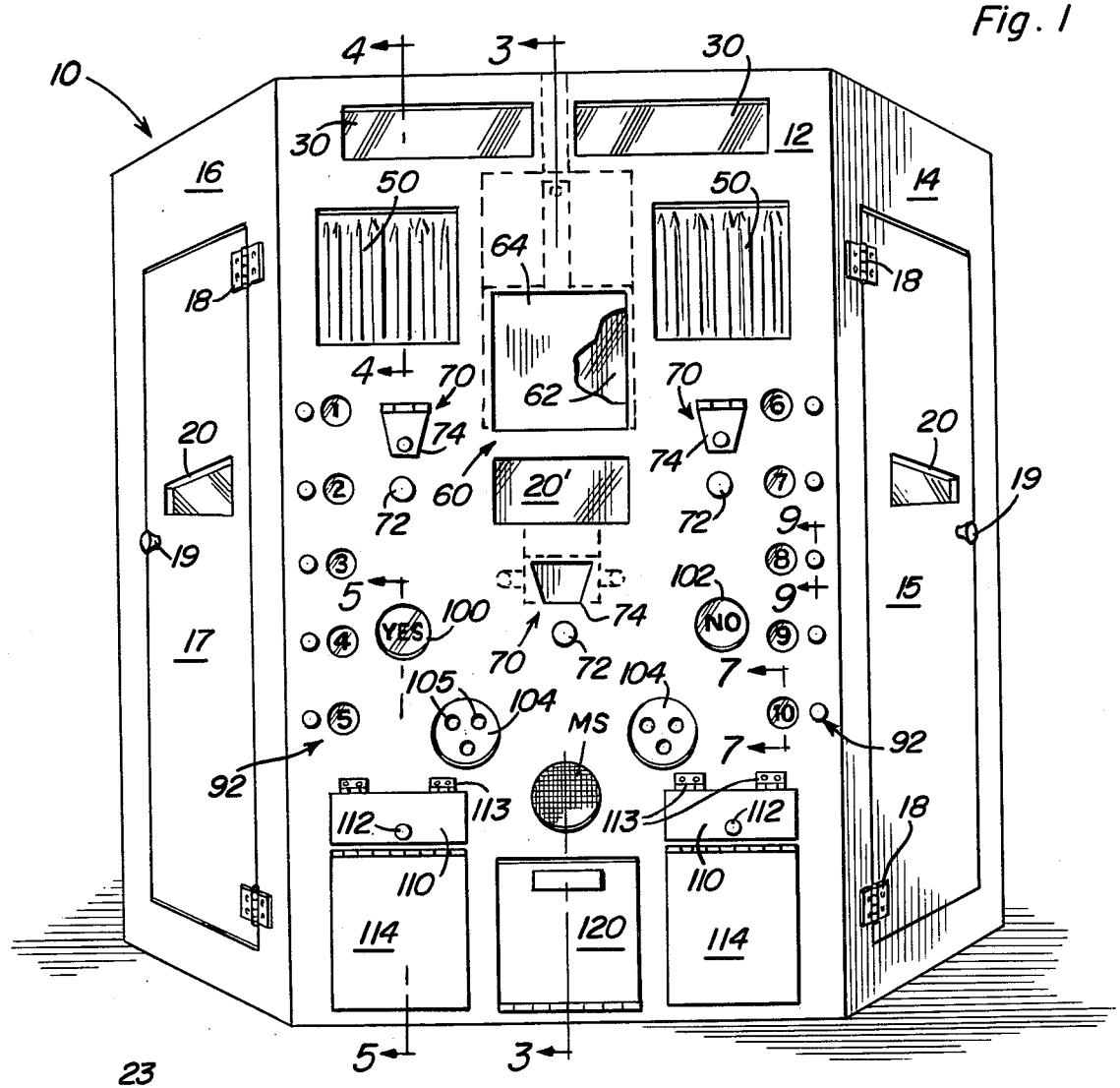
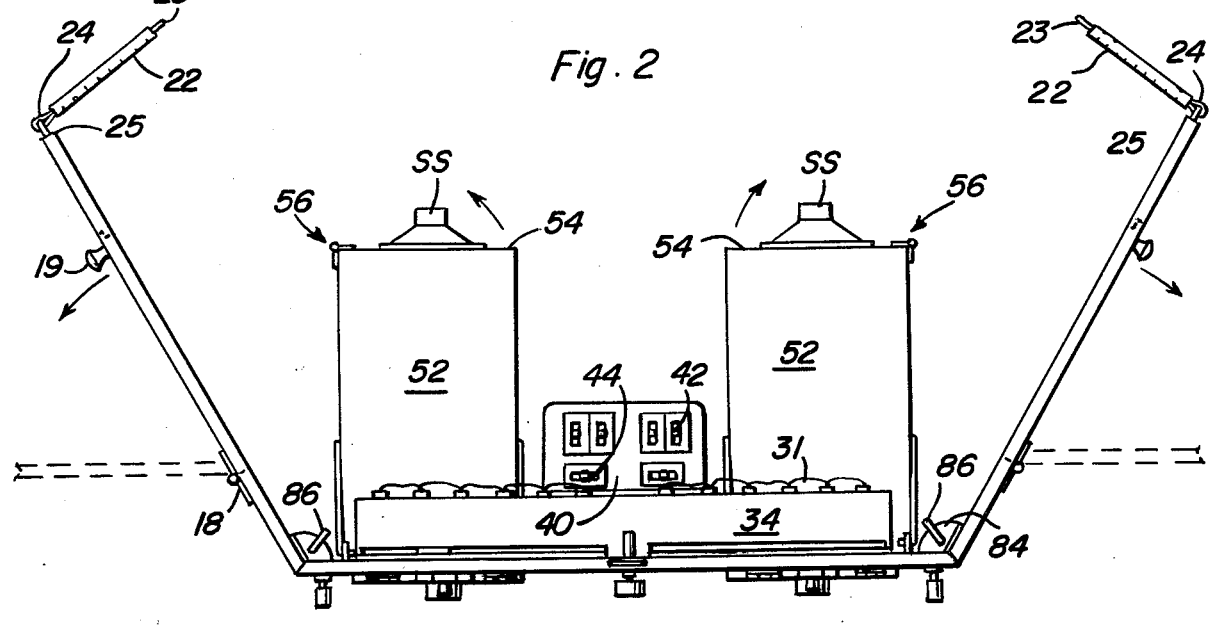

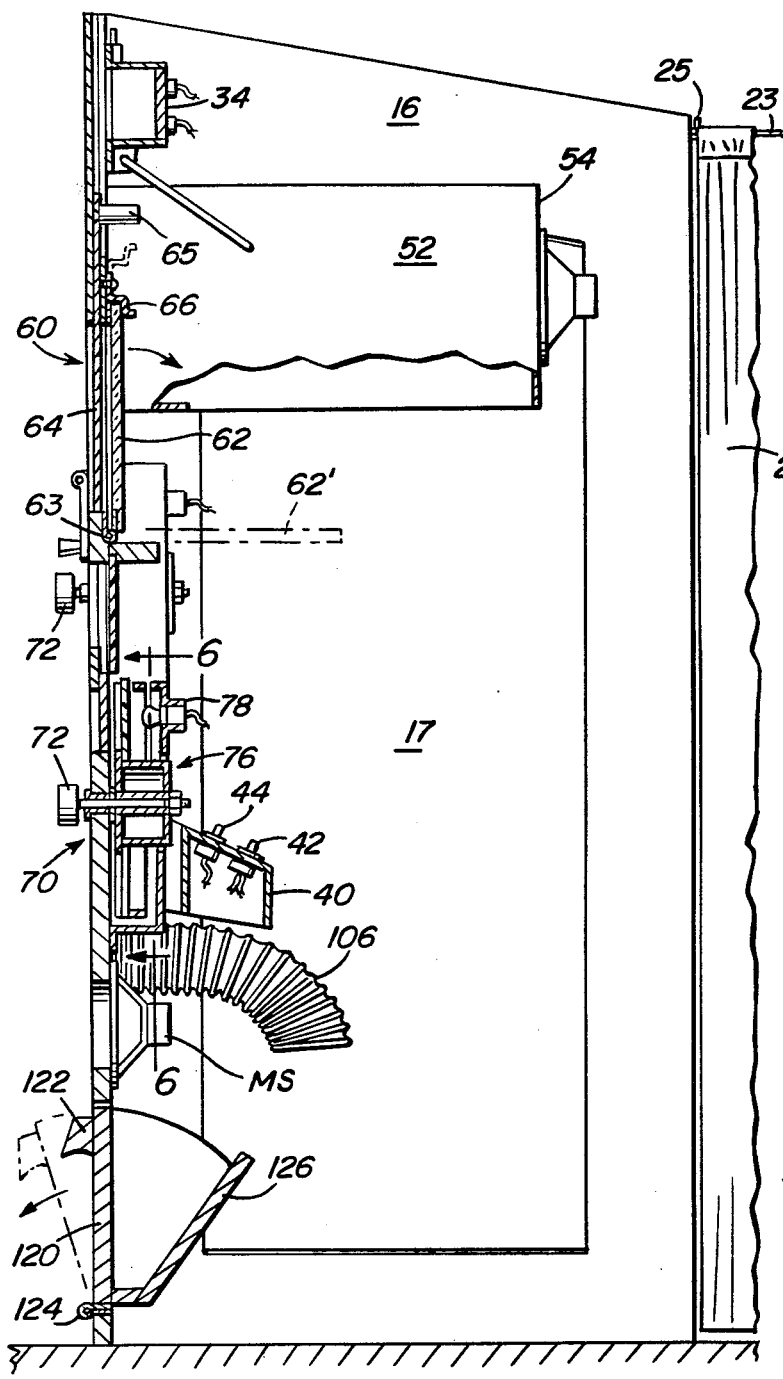
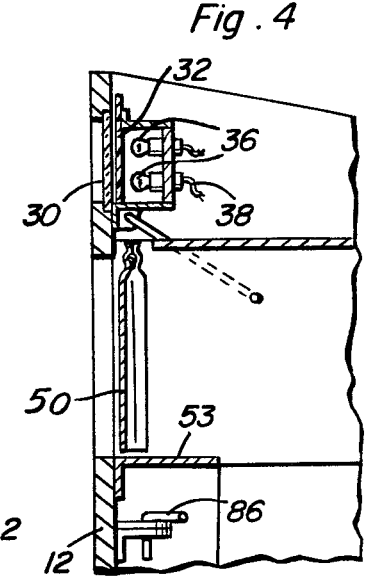
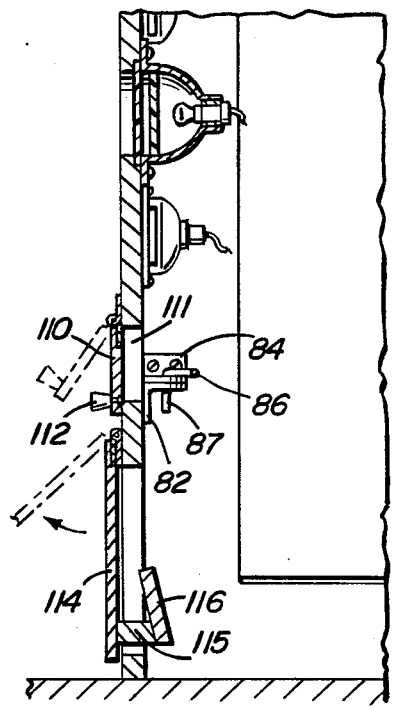
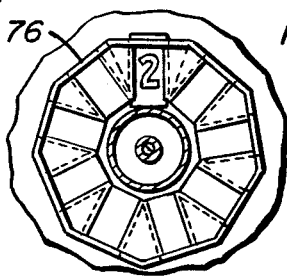
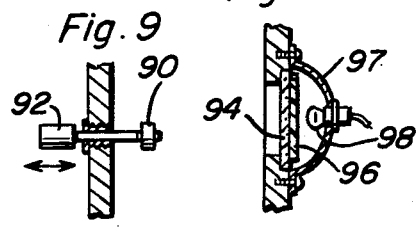
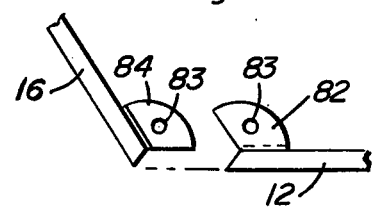

TEACHING AND DISPLAY APPARATUS

BACKGROUND OF THE INVENTION

1. Field of the Invention

This invention relates generally to devices and apparatus for teaching and display purposes. The apparatus may be used both for fun and games as well as for worthwhile instructional and educational purposes.

2. Description of the Prior Art

A common problem with known type devices for displaying various articles of interest for viewing by an audience and the like is that they are normally quite limited in the variations of display methods. Furthermore, they normally do not permit the operator thereof to be hidden from view, and do not offer the additional feature of a hidden operator which adds great mystery to the overall function of the device. For some reason, people are more often intrigued and enchanted with machines which appear to operate by themselves and which have no visible operator therefor. This hidden operation type apparatus offers charm and mystique which for some unknown reason increases the overall attractiveness of the device and the resultant usefulness thereof.

Another problem with known type apparatuses for multiple displays is that they often involve complicated electrical circuits and electronic equipment which not only are confusing for an operator without a lot of experience on same, but also greatly increases the maintenance requirements of such apparatuses.

Another problem with known type devices is that they are not designed for easy and ready portability, and therefore are not very useful for transporting to shows, fairs, schools, etc.

Known prior art patents which may be pertinent to this invention are as follows: U.S. Pat. Nos. 3,173,400 — Sep. 19, 1939 and 3,608,222 — Sep. 28, 1971.

None of these known prior art devices offers the new and unique features of the invention disclosed herein.

SUMMARY OF THE INVENTION

An object of the present invention is to provide a multi-purpose display and teaching apparatus for use with audiences which will permit an operator thereof to convey messages to the audience and receive messages therefrom.

Another object of the present invention is to provide a teaching and display apparatus which permits an operator thereof to be completely concealed from view of the audience with which it is used and will permit said operator to display slides, films, puppets, marionettes, shadow masks, flashcards, or any combination thereof together with sound or without sound.

A further object of this invention is to provide a teaching and display apparatus which is provided with complete sound systems for both monaural broadcasting as well as stereo broadcasting.

An additional further object of this invention is to provide a display apparatus which may be used to exchange gifts with the audience and includes out-passage panels and ramps as well as an input receptacle therewith. Also, mechanical arm structure is provided to permit the operator inside of said apparatus to play a part in such transfer while remaining completely concealed from view by the audience.

An additional still further object of this invention is to provide a display apparatus which may be used for both teaching purposes as well as amusement purposes complete with various alphabetic, numerical and short answer type display panels for ease and simplicity in answering questions to the machine and operator therein by the audience.

The teaching and display apparatus of this invention has a number of new and unique features. It is arranged with at least three panels for the purpose of shielding the operator from the audience with which the apparatus is to be used together with a cloth or other type enclosure for the back side of the apparatus. The apparatus is sufficiently expandable because of the cloth back enclosure to contain any reasonable amount of equipment therewithin which may be needed by the operator to effect the desired purposes thereof. The separate parts are each connectable to each other in a quick connect-disconnect manner to afford complete portability of the overall apparatus. Doors are provided in the apparatus so the operator may quickly and easily be either inside or outside of the machine itself. The main control panel for the machine is inside the panel and permits the operator when inside to control all functions thereof. The machine is a multi-media center for children and adults alike which makes use of, among other things, a rear projection screen for projecting motion picture films and the like together with an opening in front of said screen so that flashcards may be placed in front for illuminated display. The rear projection screen is useful for flashcards, films, slides, shodow plays and any combination thereof. It also can be used simultaneously with two puppet stages which are provided as well as the sound systems included with the apparatus.

The machine is further equipped with rotating discs which are removable so as to afford an unlimited variety to the display. These may be equipped with any number of different teaching and display devices for adding a great variety to the overall effect of the apparatus. The machine also includes two, separately lit, separately wired for sound, puppet stages. These stages may be used with hand puppets, marionetts, mime, or any combination thereof. A curtain is normally provided at the front of each of these separate stages for individual control by the operator of the device. Thus, the operator inside of the apparatus may put on shows on one or both stages together with the appropriate sound effects needed therefor. A helper in some cases may also be used when a separate show is being presented on each of the separate stages.

The machine of this invention also has the provision for the exchange of objects with the audience through input and output devices. The input portion consists of a pivotal bin structure or reception of an article from the audience when the receptacle is open and to permit transfer to the operator within the apparatus when the bin is closed. Two outflow ramps are provided together with outlet doors to permit the operator of the apparatus to give gifts to the audience and also return merchandise thereto. The apparatus is also provided with "mechanical arms" for operation by the operator from inside of the machine. These arms permit the operator to maintain the illusion that the machine itself is doing everthing and helps in achieving the mystique which is created by the apparatus.

The machine is provided with a public address or P.A. system of the monaural type for communicating from inside the machine to the audience and the operator may answer questions posed to the apparatus from the audience. The operator may be provided with numerous equipments inside of the machine because of the expandable feature of the back cloth enclosed portion. The ability to change the overall size of the apparatus is an important feature and if additional size is needed, additional cloth back portions may be simply hooked on to the existing ones to greatly increase the size of the overall structure.

The rear projection screen is hinged so that it can be folded down to stack flashcards upon it. The machine also has an alphabet grid display structure consisting of all 26 of the individual letters of the alphabet in individual display areas. These may all be lit together or individually to spell out messages. Externally operated knobs are provided on the machine to permit the audience to indicate to the operator therewithin particular signals. The knobs themselves are not directly connected to any electrical equipment or any operating apparatus, but merely indicate to the operator within the machine that a particular function is desired by the participant from the audience. This arrangement greatly simplifies the structure of the apparatus, but still permits a great number of inputs to be provided for audience participation.

The machine also has numerous sliding panels that uncover display discs and rear projection screens. Tape recording systems and other playback systems may also be plugged into the audio equipment of the machine for broadcasting therethrough. A dimmer switch mounted on the control panel of the machine can be hooked to outside lighting to control such external lighting as desired by the operator. One-way mirrors are also provided in the front panel as well as in each of the doors in the two side panels to permit the operator a view of the audience without them being aware of it. The machine is a multi-media apparatus using all facets of audio-visual aids. It can be used for entertainment as well as education and greatly expands the capabilities of a competent operator.

These together wtih other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front view of the teaching and display apparatus of this invention.

FIG. 2 is a top plan view of the device.

FIG. 3 is a side elevational view, partly in cross-section, taken generally along line 3—3 of FIG. 1.

FIG. 4 is an upper fragmentary portion in side elevation, partly in cross-section, taken generally along line 4—4 of FIG. 1.

FIG. 5 is a lower fragmentary portion in side elevation, partly in cross-section, taken generally along line 5—5 of FIG. 1.

FIG. 6 is a fragmentary portion taken generally along line 6—6 of FIG. 3.

FIG. 7 is a mounting of one of the display windows and light therefor.

FIG. 8 is a corner hinge pin connection detail per se.

FIG. 9 is a detail view taken along line 9—9 of FIG. 1.

DESCRIPTION OF THE PREFERRED EMBODIMENT

Referring to FIG. 1 of the drawings, reference numeral 10 indicates in general the teaching and display apparatus of this invention. There can be seen a front panel 12 having a plurality of display windows together with numerous doors, knobs, pins and the like. On the right side as viewed from the front of FIG. 1 is a side panel 14 having a door structure 15 mounted therewithin. On the left side is another removable panel structure 16 having another door 17 mounted in this panel. Appropriate mounting hinges 18 together with knobs 19 and one-way viewing mirror windows 20 are provided for each of the doors 15, 17.

Looking at FIGS. 4, 5, and 8, the connecting corner hinge pin structure for holding this side panels 14 and 16 to the front panel 12 may be seen. Each of the respective panels are provided with at least two of the hinge members 82 and 84 for connecting the panels at both the top and bottom of same to the front panel. Appropriate apertures are provided approximately in the center of each of the corner connectors 82, and 84 as indicated by reference numeral 83 in FIG. 8. A hinge pin member 86 of right angle shape may be quickly and easily slipped through these apertures to positively connect in a quick attach-detach manner the side panels to the front panel. While the hinge pin connectors shown in FIG. 8 are for the left side panel connection, a similar right side structure as best seen in FIG. 2 is also provided.

Looking at the side elevation of FIG. 3 as well as the top plan of FIG. 2, one can see the rear curtain structure which permits unlimited size for the overall apparatus. Appropriate support hooks or the like, not shown are fastened to the wall behind the apparatus for connection of the lines 23 between such hooks and the hooks 25 provided on the rear of panels 14 and 16 respectively. The lines 23 may be provided with terminal loops 24 to permit a quick attachment of these lines to the hooks 25. Appropriately supported from the lines 23 are draw curtains 22 of cloth of preferably nylon type material. The nylon is lightweight and yet very strong and if of black or other dark color will not be easily visible from the audience in front of the overall apparatus. This type curtain, such as used for magic shows and the like permits a great expansion of the overall size of the apparatus when desired or necessary. Thus, additional pieces of sound equipment, visual projection equipment and the like may be easily used with the front panel of the display apparatus and still conceal the operator and equipment from view by the audience.

At the top of the front panel are two windows 30 having mounted there behind alphabet grid structure 34. Appropriate light bulbs 36 and 38 are mounted in rows across the entire width of the display panels 30 and the letters of the alphabet are appropriately spaced therealong. Thus, the operator within the apparatus may light any of the letters as desired to spell words or make other letter combinations for the audience. A control panel 40, as can best be seen in FIGS. 2 and 3, is also provided for use by the operator and contains a plurality of control switches and rheostat devices 42, 44. Appropriate controls for the alphabet grid structure 30,34 are included on this panel in order to control the string of lights 36 and 38. Conventional type electrical wiring 31, preferably of the low voltage type, is used to connect the lights together with the control panel and an appropriate power source.

Two multi-purpose stages are also provided for the apparatus and may be seen at the curtains 50 in FIG. 1. Behind the curtains are large box-like structures 52 having open front and bottom portions thereto. A small stage platform 53 is provided attached to the front panel 12, as best seen in FIG. 4. The rear panels of the stage boxes, as indicated by reference numeral 54 in FIG. 2, are hinged at 56 so that the rear of the stages may be opened. Mounted upon the rear panels 54 are stereo speakers SS. The hinges 56 are of the quick attach-detach type so that the speakers may be detached and placed in other positions if desired. However, generally the speakers will be positioned as shown and will broadcast the desired audio output to the audience through the openings at the curtains 50 in stereo fashion. Either live or recorded sound may obviously be broadcast over the stereophonic sound system. Appropriate lights for the stages 53 together with a dimmer control on the control panel 40 are also included. A dimmer control for outside lights external to the apparatus may also be provided on the panel 40 to permit the operator of the apparatus to control the lights in the auditorium. The stages 53 together with the stage boxes 52 permit the operator to display puppets, marionettes, hands, faces, masks, drawings, films, and slides, etc.

In the upper center portion of the front panel is a rear projection screen 62 which will permit the rear projection of slides, films, shadows, as well as lit displays of flashcards, drawings, etc., or any combination of these.

The opening 60 for the rear projection screen 62 is normally provided with a slidable cover plate 64 having an extendable handle portion 65 for operation by the operator of the apparatus. The rear projection screen 62 is hinged at 63 and provided with a pivotable clip fastener 66 so that the operator may release the clip 66 and swing the rear projection screen 62 inwardly to form a support platform as shown in dotted lines in the view of FIG. 3. This arrangement permits another stage sort of platform 62' for supporting flashcards and the like for easy viewability by the audience through the window opening 60. This obviously would be used in this manner when rear projection of films or slides is not taking place.

Three "disc panels" are also provided on the front of the apparatus as indicated by reference numeral 70. Each of these "disc panels" has a knob 72 for rotation of the disc structure within the apparatus from outside the apparatus by audience participants. Viewing windows together with slidable or hinged closures 74 are also shown. Behind the windows are the rotatable disc structures 76. Each of the disc structures 76 as a plurality of nine sections therewithin and therefore up to nine separate objects may be mounted within the disc receptacles for rotations therewith and to provide lit display thereof to the audience participants. The operator inside the apparatus may also rotate the disc by grasping the outside portions thereof. Appropriate lights 78 (FIG. 3) are provided for the individual sections of each rotatable disc structure. FIG. 6 shows the rotatable disc panel 76 with the numeral 2 in one of the display sections. Obviously any type of small object may be displayed in these receptacles.

In addition to the one-way mirrors 20 provide in the two doors, another one-way mirror structure 20' is mounted in the front panel. This permits the operator to discreetly view the audience reaction to the display currently being provided by the apparatus. It also increases the mystique of the device.

Extending vertically along each of the edges of the front panel are knobs 90 and 92, which as seen in FIG. 9 in cross-section, may be operated by an audience participant to indicate to the operator inside a desired function. The knobs 90,92 actually are not connected to any mechanical or electrical structure within the apparatus, but merely move the enlarged inner button 90 on the inside of the apparatus to indicate to the operator what the participant wishes. These knobs do not actually turn on anything but effectively present that illusion since a skilled operator may very quickly perform the desired function upon an indication by an audience participant that such function is desired. Arranged in alignment with these knobs 92 are grid numbers, indicated by numerals 1 through 10 in FIG. 1. FIG. 7 shows a cross-section through one of the grid numbers and consists of a glass cover plate 94, a transparent number display film 96 and an appropriate reflector 97 with light 98. Again, conventional electrical wiring is provided between the various lights 98 for the respective numbers and the control panel 40 with appropriate switches provided thereon. Obviously instead of numerals 1 through 10 other display structures could be provided. While all of the numbers 1 through 10 are shown illuminated in the view of FIG. 1, normally only one or two would be lit at a time. The reason for all being shown lit in the drawing is for ease in illustration of the apparatus. Similarly, YES and NO windows 100 and 102 are provided. Again, only one of these windows as appropriate would be lit at one time, but again for purposes of illustration, both are shown lit in this Figure.

Reference numerals 104 on the front panel of FIG. 1 indicate a pair of mechanical arms 106 contained within the apparatus. These mechanical arms basically are nothing more than 4 or 5 inch tubular ducting of a flexible nature, preferably of plastic material, which will permit the operator of the device to insert his arms thereinto and thus allow him to manipulate packages, gifts, and other articles of interest in front of the machine. Fingers 105 extend outwardly from the front of the arms. Since the audience cannot see the operator's hands and arms, but merely see the mechanical flexible sleeves, they get the impression that the machine itself is doing the manipulation. Normally, the mechanial arms remain hidden and retracted until the operator of the machine is ready to activate and use them. The arms can be moved in variety of fascinating ways and further the illusion and mystique of the device. The hands and arms move, grasp and release much like human ones, obviously because human ones are within them.

A monaural speaker is indicated by MS and is placed in the center lower portion of the front panel. This speaker as well as the two stereo speakers SS may operate within the apparatus or may also be hooked up with others which are run outside of the apparatus. This speaker is normally provided as part of the public address system and may be operated separately from the stereo system as described above.

Provided on the lower front of the panel on either side of the monaural speaker are lift panels 110 appropriately suspended by hinges 113 having opening knobs 112. These panels when open permit gifts and other objects for the audience to be deposited by the operator through apertures 111 provided in the front panel 12. Appropriate slide ramps 114 are provided directly beneath each of these lift panels which may be extended by the operator, through use of the mechanical arms, and permit the gifts to be slid down from the apparatus onto the stage in front of the apparatus. Appropriate support structure 115, 116 (FIG. 5) is provided for the front portion of said ramps 114. When the operator within the apparatus wishes to give gifts, prizes or rewards to an audience participant, he may use the mechanical arms 104, 105, 106 to open the panels 110, either simultaneously or individually, and also use the arms to extend the slide ramps 114, and thus add to the illusion of the machine doing a lot of different things.

A final structure of the apparatus is the exchange bin 120 which opens and closes in a pivotal manner in order to allow the audience to exchange items with the machine. When this exchange bin 120 is open, as indicated in dotted lines in FIG. 3, the participant from the audience may redeposit a prize or gift into the machine for some additional chance or opportunity. As can be best seen in FIG. 3, the exchange bin has a handle structure 122 provided near the top thereof and pivotal hinge structure 124 along the bottom thereof. A bin receptacle 126 is provided on the back portion of the front panel 120.

From the above description of the teaching and display apparatus of this invention, one can readily visualize how many different displays and functions can take place either individually, or simultaneously. Coupled with both the monaural audio system as well as the stereo system, this apparatus permits a complete range of audio-visual teaching and instructional aids to be utilized. Furthermore, the device may be used for amusement and pure entertainment as well.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A teaching and display apparatus comprising: first means for providing a portable support structure, second means associated with said first means for the display of various items for education and entertainment, and third means for providing associated audio messages along with the second means, the first means including a main support panel, at least one secondary support panel attachable to the main support panel by quick attach-detach means, and an access opening providing in said secondary support panel for an operator of the apparatus, the second means including at least one stage for puppet shows and the like, a rear view projection screen for films and the like, and at least one rotatable display panel for various objects.

2. The structure as set forth in claim 1, wherein the second means further includes means for discharging items to the audience, and means for receiving items from the audience.

3. The structure as set forth in claim 2, wherein the second means further additionally includes audience participant controlled indicator buttons for signalling a desired function to the operator of the apparatus, and mechanical arms mounted on the main support panel for operation by the operator.

4. The structure as set forth in claim 3, together with numerical grid panels, alphabetic panels, YES and NO panels, all mounted upon the main support panel and connected for operation by the operator of the device within the apparatus.

5. A teaching and display apparatus comprising: first means for providing a portable support structure, second means associated with said first means for the display of various items for education and entertainment, and third means for providing associated audio messages along with the second means, the first means including a main support panel, two secondary support panels attachable on either side of the main support panel by quick attach-detach means, and back enclosure means for completely enclosing the operator of the apparatus from view of the audience and yet permit expansion of the size of the apparatus as needed, the back enclosure means including a quick attach-detach portable and expandable drape structure, each of the side panels being provided with an access opening, each access opening having a door for closing said opening, each door provided with a one-way mirror to permit the operator within the apparatus to view the audience without them being aware of it, the main support panel also being provided with a similar one-way mirror, and means for discharging gifts through the main support panel for reception by audience participants.

6. The structure as set forth in claim 5, together with means on the main support panel for reception of items from the audience, two stages for presenting puppet shows and the like, a rear view projection screen for films, slides, and the like, and associated stereo and monaural sound means for providing complete audio coverage of the visual displays as presented by an operator within the apparatus.

7. The structure as set forth in claim 6, together with additional numeral grid panels from 1 to 10, 10associated indicator buttons for audience response to the operator within the apparatus, YES and NO indicator panels, and three rotatable display panels for containing up to nine different displays for each panel, all easily controlled by an operator within the apparatus.

8. The structure as set forth in claim 7, further including a control panel means within the apparatus, low voltage power supply means, and appropriate connections between the power supply means, the control panel means, and the electrical devices of the apparatus to permit control of same by the operator of the apparatus.

* * * * *